United States Patent [19]

Mufti

[11] Patent Number: 4,809,240

[45] Date of Patent: Feb. 28, 1989

[54] METHOD FOR INTERPRETING SEISMIC DATA

[75] Inventor: Irshad R. Mufti, Dallas, Tex.

[73] Assignee: Mobil Oil Corporation, New York, N.Y.

[21] Appl. No.: 66,802

[22] Filed: Jun. 24, 1987

[51] Int. Cl.⁴ .......................... G01V 1/30; G01V 1/34
[52] U.S. Cl. ......................................... 367/72; 367/9; 364/421
[58] Field of Search .................. 367/9, 42, 47, 68, 72; 364/421; 353/7; 352/60-63

[56] References Cited

U.S. PATENT DOCUMENTS 4,063,216 12/1977 Chapman et al. ...................... 367/72
4,393,488 7/1983 Gassaway et al. ..................... 367/47
4,590,592 5/1986 Bowman et al. ....................... 367/72

OTHER PUBLICATIONS

Longuet-Higgens, H. C., "A Computer Algorithm For ...", Nature, vol. 293, pp. 133-135, 9/10/81.
Hodges, et al., "Technology and Techniques for Stereoscopic ...", IEEE Comput., Soc. Press., pp. 107-115, 1985; abst only supplied.
Oshime et al., "Synthesis of an ... Stereoscopic Images", Appl. Opt., vol. 18, #4, pp. 469-476, 2/15/79; abst info provided.

Primary Examiner—Nelson Moskowitz
Attorney, Agent, or Firm—Alexander J. McKillop; Michael G. Gilman; Charles J. Speciale

[57] ABSTRACT

Method for displaying and interpreting seismic data. Recorded seismic data is used to produce a stereo pair of perspective plots of seismic section for selected areas of the seismic data. The pair of perspective plots are used to produce a stereoscopic view of the seismic section. Examination of the stereoscopic view of the seismic section permits the identification of geological characteristics indicative of possible hydrocarbon deposits, including positive geophysical characteristics which would not be identifiable by examination of a single perspective plot of a seismic section alone.

9 Claims, 4 Drawing Sheets

METHOD FOR INTERPRETING SEISMIC DATA

BACKGROUND OF THE INVENTION

This invention relates to the processing of seismic data to render it more useful in interpreting the geological characteristics of the earth in the exploration for oil and gas deposits. Specifically, the invention relates to a novel method of displaying seismic data plotted in perspective form as a stereo pair with pre-determined parallax in order to identify the possible presence of hydrocarbon deposits or structural features associated with such deposits.

In seismic exploration, data is obtained by first creating an artificial disturbance along the earth by use of dynamite or the like. The resulting seismic waves travel downwardly in the earth and are reflected upwards from subsurface reflecting interfaces. The reflected waves are detected by arrays of sensitive devices called geophones located along the gound and recorded by reproducible means. The recorded waves, which contain information regarding the amplitude and arrival time of the reflected waves, information known to be useful in identifying possible hydrocarbon deposits, are known commonly as seismograms. In a typical seismic exploration, seismic energy would be recorded at uniformly spaced locations along a selected line of exploration to produce a series of seismograms along the line of exploration.

Methods of deriving information concerning geological characteristics of a subsurface formation from acquired seismic data are too numerous to mention. One method is to use the acquired seismic data to generate a perspective plot of the seismic data in which the effect of three-dimensional relief is obtained. In the practical application of generating a perspective plot of seismic data, three principal axes are selected and the data plotted with respect to the axes. One such selection of axes would involve the selection of arrival time of the seismic impulse along the x-axis, amplitude of the seismic impulse along the z-axis, and profile direction (profile direction being defined here as the location of the seismic geophones along the line of exploration) along the y-axis.

Once generated, the perspective plot of seismic data is a very useful tool in the interpretation of seismic data. Areas of geological interest are often recognizable upon examination of such a representation of seismic data, areas of interest usually being indicated by areas of abnormal levels of seismic energy on the seismic plot. A frequently sought-for situation which leads to such areas of abnormal seismic energy are commonly called "bright spots". However, seismic data evaluation based upon interpretation of such a seismic plot is unsatisfactory at the final stage of evaluation, i.e. during the identification of all bright spots indicative of areas of geological interest. At this point, while the standard seismic plot has identified the major locations where the seismic data indicates positive geological characteristics suggesting the presence of hydrocarbon deposits, there are still additional locations which also enjoy similar geophysical characteristics indicative of hydrocarbon deposits but which cannot be identified due to physical limitations inherent in the use of such seismic plotting methods.

SUMMARY OF THE INVENTION

Seismic data in the form of seismograms is produced by activation of a seismic source along a line of exploration and the recordation of the resultant seismic waves reflected upwards by subsurface reflecting interfaces. Areas of the seismograms which show anomalous seismic energy indicative of the possible presence of hydrocarbons and which justify a closer study are selected for further examination. A first, second and third coordinate which comprise time, profile direction and amplitude are determined for each data point of the seismograms sections selected. The first, second and third coordinates are then correlated to the x, y and z axis respectively and the coordinates for each of the selected data points are then used to make a perspective plot of the seismic section for the recorded seismograms. Parallax (i.e. a shift in the viewing angle) is introduced to the first perspective plot by shifting the origin of the first perspective plot and a second perspective plot of the seismic section is then produced using the same seismic data as the first perspective plot shifted according to the magnitude of the introduced parallax. The first and second perspective plots of seismic sections are then viewed under a stereoscope to produce a stereoscopic view of the seismic section, examination of which will show the presence of geological characteristics indicative of possible hydrocarbon deposits. Particular attention is paid to those geological characteristics which would not be apparent using a perspective plot of a seismic section alone. The locations corresponding to the geophysical characteristics of interest are then identified.

A feature of this invention is to provide a first perspective plot of a seismic section of selected seismic data. Another feature of this invention is to provide a second perspective plot of the same selected seismic data shifted by the introduction of parallax to the first perspective plot of seismic data. Still another feature of this invention is to provide for the stereoscopic examination of a "stereo-pair" of the first and second perspective plots of the seismic section. Yet another feature of this invention is to provide for the identification of geological characteristics indicative of hydrocarbon deposits within the earth formation subject to seismic exploration.

DESCRIPTION OF THE DRAWINGS

The present invention may be better understood and its numerous objects and advantages will become apparent to those skilled in the art by reference to the accompanying drawings of which.

DESCRIPTION OF THE PREFERRED EMBODIMENT OF THE INVENTION

An understanding of conventional seismic exploration will be a most helpful prerequisite to an understanding of the present invention. Therefore, reference will first be had to FIG. 1 which diagrammatically illustrates a conventional seismograph system.

Figure 1:
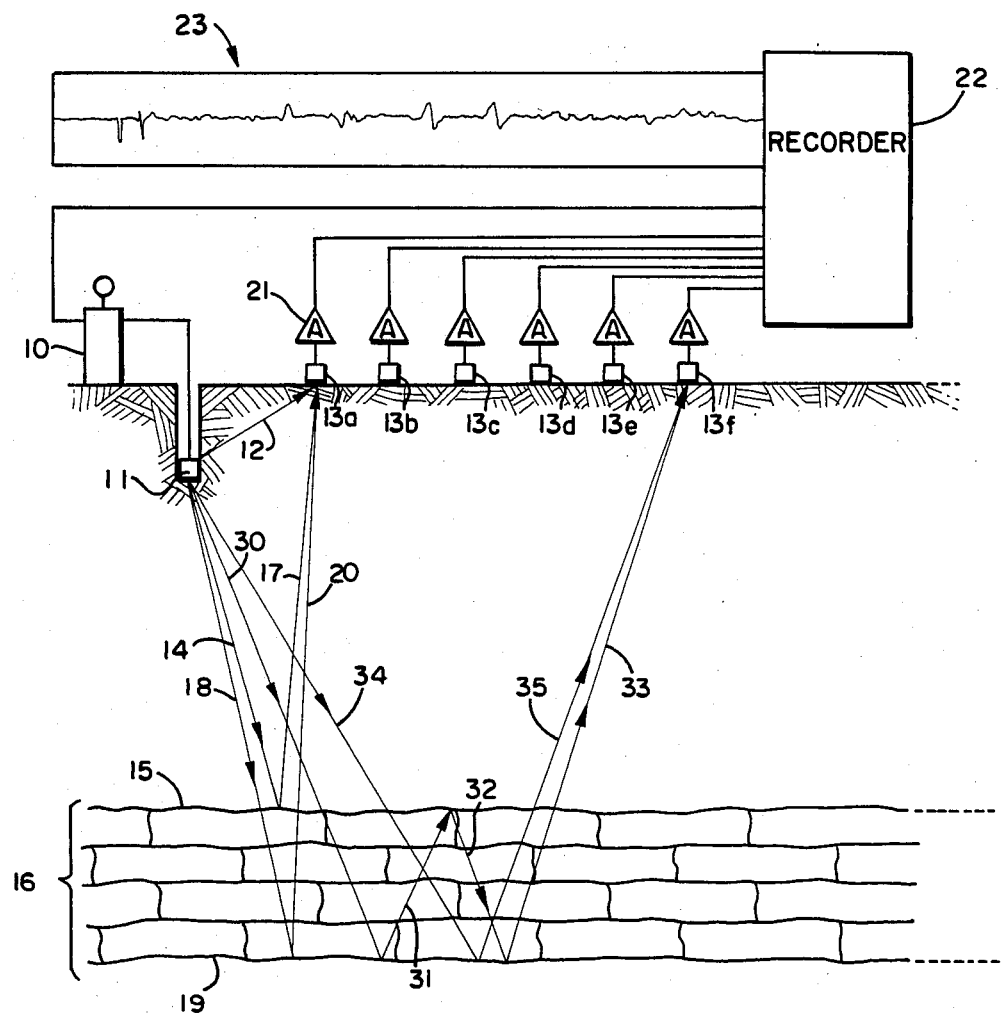
FIG. 1 illustrates a typical set of seismic rays associated with seismic exploration.

Upon actuation of blaster 10, a generator of acoustic energy such as a small charge 11 of an explosive, such as dynamite, produces an acoustic pulse. While other forms of seismic wave generators may be utilized, the detonation of an explosive is a wave generator of conventional type. The detonation initiates the travel of seismic waves from the shot point 11 downwardly through the earth strata and also by way of a more or less direct path 12 to the first detector geophone 13a. The downwardly traveling waves, for example, as along paths 14, 18, 30 and 34, are reflected from the surfaces 15, 19 of a relatively thick high velocity bed 16. The reflected waves travel along, for example, paths 17, 20, 31, 32, 33 and 35, to the detectors 13a-f. Electrical signals generated by the detectors 13a-f are applied to an amplifier 21 including the usual adjustable filters, and its output, in turn, is applied to a recorder 22. A series or group of seismic traces similar to seismic trace 23 shown in FIG. 1 are acquired by the standard seismic exploration techniques herein described and may be analyzed to yield valuable information regarding the geological characteristics of the explored subsurface region by manipulating such seismic data in accordance with the methods described below and made reference to by the flowchart labelled FIG. 2.

Figure 2:
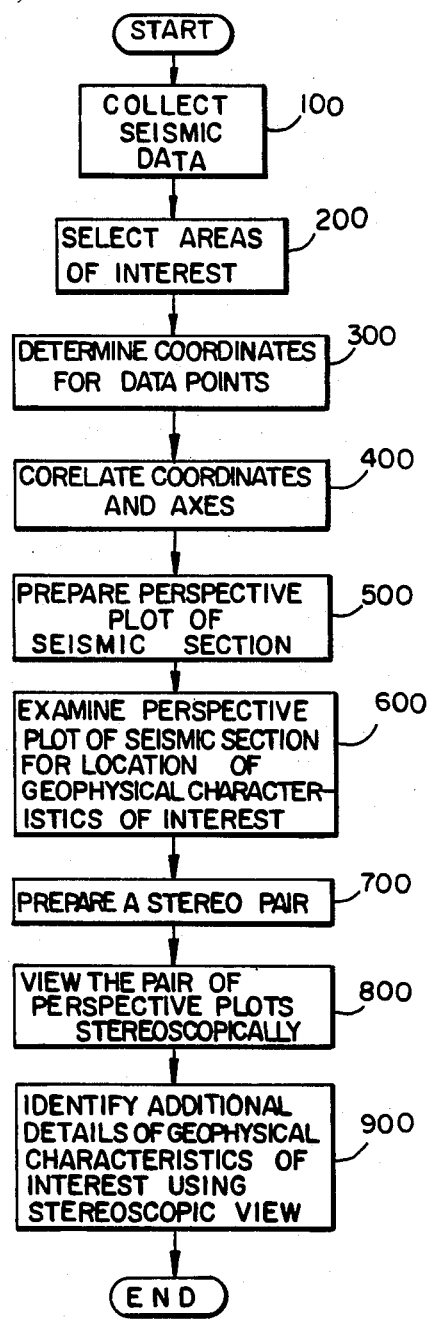
FIG. 2 is a flow-chart of the major steps of the method for interpreting seismic data using stereoscopic techniques.
Figure 3:
FIG. 3 is a first perspective plot of a seismic section of a set of seismic traces taken along a designated line of exploration.
Figure 4:
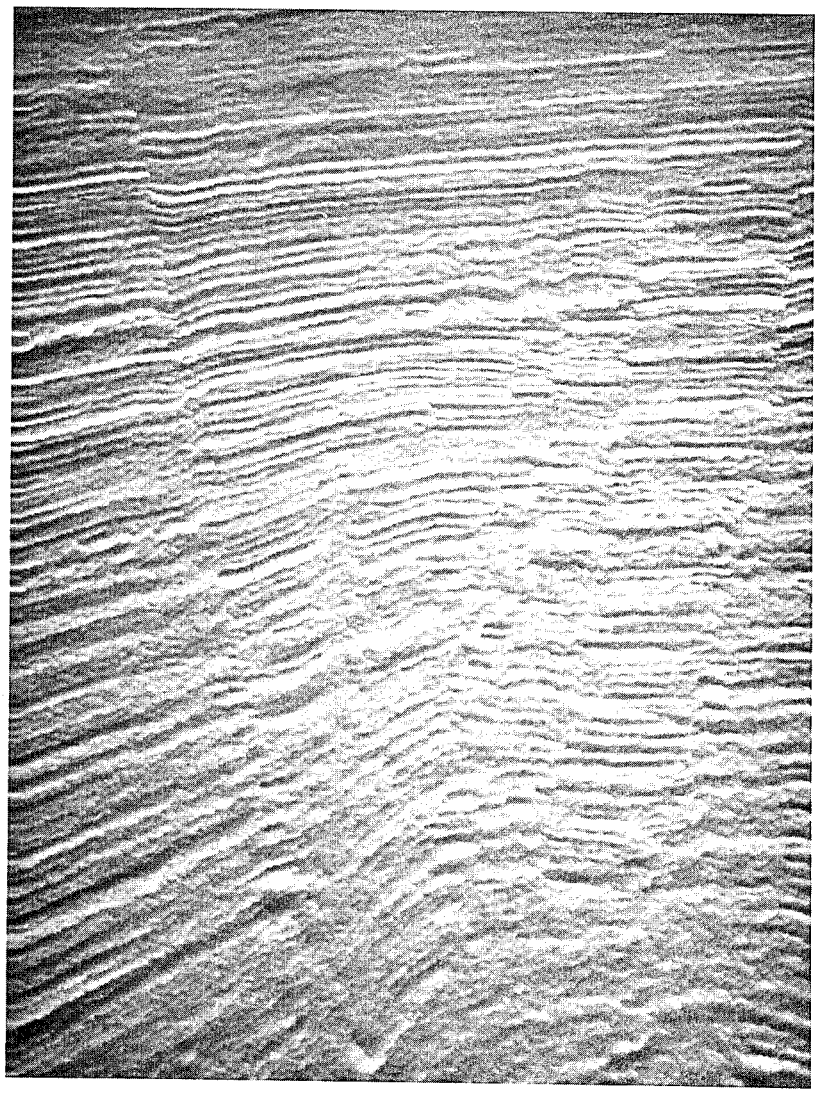
FIG. 4 is a second perspective plot of the same seismic section plotted in FIG. 3 shifted by the introduction of parallax.

Turning next to FIG. 2, seismic data gathered through the employment of standard seismic exploration methods such as the methods described above is collected at 100. Areas of the gathered seismic data of interest are selected at 200. A typical area of intrest which will be selected at step 200 is a portion of the gathered seismic data for a particular range of depths where anomalous seismic amplitudes are indicated by an inspection of the gathered seismic data. First, second and third coordinates (time, direction and amplitude, respectively) for each seismic data point within the selected area of interest are determined at step 300. Each of the first, second and third determined coordinates are correlated to the x, y and z-axis respectively at step 400. While any of the six possible axes correlation sets may be used, it has been found that correlating the time coordinate with the x-axis, profile direction with the y-axis and amplitude with the z-axis is satisfactory. At step 500, the selected seismic section of the seismic data is utilized to prepare a perspective plot of the selected seismic section with reference to the designated axes of step 400. An example of a perspective plot of a selected seismic section of seismic data may be seen by reference to FIG. 3. The perspective plot of the selected seismic section is examined at step 600 to determine the presence and location of geophysical characteristics within the surveyed subsurface area indicative of hydrocarbon deposits. For example, the perspective plot may be examined for "bright spots", i.e. areas of a seismic plot where significant amounts of abnormal seismic energy is detected. For a typical perspective plot of seismic data, a "bright-spot" is indicated by dark areas caused by high amplitude measurements for the detected seismic waves. A stereo pair for the perspective plot, i.e. a second perspective plot of the same seismic section of selected seismic data, is prepared at step 700. To prepare the stereo pair, the viewing angle for the first perspective plot is shifted to produce a second perspective plot of the selected seismic data. This viewing angle shift may be satisfactorily accomplished in many ways, the preferred method being selecting a degree of shift followed by shifting the origin of the first perspective plot by the selected degree of shift. Shifting the first perspective plot by the selected degree of shift produces a second perspective plot. In such a manner, the second perspective plot, which is comprised of the same seismic data as the first perspective plot, has parallax introduced to the perspective plot. An example of a second perspective plot of the selected section of seismic data of FIG. 3 shifted by the introduction of parallax may be seen by reference to FIG. 4. Proceeding to step 800, the first and second perspective plots of the seismic section of the selected seismic data are viewed under a stereoscope of standard design such as a Model 2220 Stereoscope manufactured by the Wild Heerbrugg Company of Switzerland. Use of the stereoscope permits examination at 900 of the stereoscopic image of the first and second perspective plots, such stereoscope imaging permitting a more detailed examination of the selected seismic data which will include the identification of the presence and location of additional geophysical characteristics within the surveyed subsurface area indicative of hydrocarbon deposits. Such further identification will include the location of positive geological indicators in areas previously classified as lacking any positive geological indicators and will further permit a more conclusive determination of the quality of positive geological indicators located than using conventional, non-stereoscopic analysis of a single perspective plot of a seismic section of selected seismic data.

Thus, there has been described and illustrated herein a method for interpreting seismic data. However, those skilled in the art wil recognize that many modifications and variations beside those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed:

1. In seismic exploration wherein seismic sources are activated at spaced locations along a line of exploration and the amplitude of reflections of said seismic energy are recorded as a function of time along said line to produce seismograms, a method of interpreting seismic data plotted in a display comprising:

preparing a first perspective plot of a seismic section of said seismograms;

preparing a second perspective plot of said seismic section, said second perspective plot prepared by introducing parallax to said first perspective plot;

producing a stereoscopic view of said first and second perspective plots; and identifying locations of geophysical characteristics indicative of possible hydrocarbon deposits corresponding to locations on said seismograms by anaylzying said produced stereoscopic view of said first and second perspective plots.

2. The method of claim 1 wherein the step of preparing a first perspective plot of a seismic section of said seismograms comprises the steps of:

selecting areas of said seismograms to produce said seismic section;

determining a first, second and third coordinate for each data point of said selected seismic section;

selecting an axis for each of said first, second and third coordinates; and plotting a first perspective plot of said seismic section.

3. The method of claim 1 wherein the step of introducing parallax to said first perspective plot further comprises the step of shifting the origin of said first perspective plot.

4. The method of claim 1 further comprising the steps of:
  examining said first perspective plot of said seismic section to identify locations of geological characteristics indicative of possible hydrocarbon deposits corresponding to data points on said seismograms; and
  comparing said locations of geological characteristic indicative of possible hydrocarbon deposits derived from said examination of said first perspective plot of said seismic section and said locations of said geological characteristics indicative of possible hydrocarbon deposits derived from said stereoscopic examination of said first and second perspective plots of said seismic section to provide additional information regarding said locations of geological characteristics indicative of possible hydrocarbon deposits.

5. The method of claim 1 wherein the step of identifying locations of geological characteristics indicative of possible hydrocarbon deposits further comprises the steps of:
  viewing said first and second perspective plots, one with and the other without introduced parallax, of said seismic section through a stereoscope;
  examining said stereoscopic view for geological characteristics indicative of possible hydrocarbon deposits; and
  identifying the locations of said geological characteristics indicative of possible hydrocarbon deposits.

6. In seismic exploration wherein seismic energy is generated at spaced locations along a line of exploration and the amplitude of reflections of said seismic energy are detected as a function of time along said line to produce seismograms, a method of interpreting seismic data plotted in a display comprising:
  selecting areas of said seismograms to produce a seismic section;
  determining a first, second and third coordinate for each data point of said selected seismic section;
  selecting an axis for each of said first, second and third coordinates;
  plotting a first perspective plot of said seismic section;
  introducing parallax to said first perspective plot of said seismic section;
  plotting a second perspective plot of said seismic section, said second perspective plot of said seismic section comprising said first perspective plot combined with said introduced parallax;
  viewing said first and second perspective plots of said seismic section through a stereoscope;
  examining said stereoscopic view of said first and second perspective plots for geological characteristics indicative of possible hydrocarbon deposits; and
  identifying locations of said geological characteristics indicative of said possible hydrocarbon deposits.

7. The method of claim 6 wherein the step of introducing parallax to said first perspective plot further comprises the step of shifting the origin of said first perspective plot.

8. The method of claim 6 wherein the step of identifying locations of said geological characteristics indicative of said possible hydrocarbon deposits further comprises the steps of:
  examining said first perspective plot of said seismic section to identify locations of geological characteristics indicative of possible hydrocarbon deposits; and
  comparing said locations of geological characteristics indicative of possible hydrocarbon deposits derived from said examination of said first perspective plot of said seismic section and said locations of said geological characteristics indicative of possible hydrocarbon deposits derived from said stereoscopic examination of said first and second perspective plots of said seismic section to provide additional information regarding said locations of geological characteristics indicative of possible hydrocarbon deposits.

9. In seismic exploration wherein seismic energy is generated at spaced locations along a line of exploration and the amplitude of reflections of said seismic energy are detected as a function of time along said line to produce seismograms, a method of interpreting seismic data comprising the steps of:
  plotting a first perspective view of said seismograms;
  examining said first perspective plot of said seismograms;
  identifying locations of geological characteristics indicative of possible hydrocarbon deposits based on said examination of said first perspective plot;
  shifting said first perspective view of said seismograms to produce a second perspective view of said seismograms;
  plotting said second perspective view of said seismic section;
  viewing said first perspective plot of said seismograms and said second perspective plots of said seismograms through a stereoscope;
  examining said stereoscopic view of said first and second perspective plots;
  identifying locations of geological characteristics indicative of possible hydrocarbon deposits based on said stereoscopic examination of said first and second perspective plots;
  comparing said locations of geological characteristics indicative of possible hydrocarbon deposits derived from said examination of said first perspective plot of said seismograms and said locations of said geological characteristics indicative of possible hydrocarbon deposits derived from said stereoscopic examination of said first and second perspective plots of said seismograms to provide additional information regarding said locations of geological characteristics indicative of possible hydrocarbon deposits.

* * * * *